United States Patent
Chou et al.

(10) Patent No.: US 8,389,604 B2
(45) Date of Patent: Mar. 5, 2013

(54) METHOD FOR PROVIDING TOUGHENED POLY(TRIMETHYLENE TEREPHTHALATE) MOLDING RESINS

(75) Inventors: Richard T. Chou, Hockessin, DE (US); Toshikazu Kobayashi, Chadds Ford, PA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 220 days.

(21) Appl. No.: 12/916,830

(22) Filed: Nov. 1, 2010

(65) Prior Publication Data

US 2011/0105674 A1    May 5, 2011

Related U.S. Application Data

(60) Provisional application No. 61/257,108, filed on Nov. 2, 2009.

(51) Int. Cl.
| | |
|---|---|
| C08J 3/22 | (2006.01) |
| C08L 67/00 | (2006.01) |
| C08L 31/08 | (2006.01) |
| C08F 283/10 | (2006.01) |

(52) U.S. Cl. ........ 523/351; 523/423; 524/504; 524/505; 524/539

(58) Field of Classification Search ................ 524/504, 524/505, 539; 523/423, 351
See application file for complete search history.

(56) References Cited

U.S. PATENT DOCUMENTS

| | | | |
|---|---|---|---|
| 3,404,134 A | 10/1968 | Rees | |
| 3,766,146 A | 10/1973 | Witsiepe | |
| 4,725,481 A | 2/1988 | Ostapchenko | |
| 6,232,400 B1 * | 5/2001 | Harris et al. | 525/176 |
| 6,277,947 B1 | 8/2001 | Kelsey et al. | |
| 6,441,129 B2 | 8/2002 | Duh et al. | |
| 6,462,145 B1 * | 10/2002 | Fleri et al. | 525/444 |
| 6,518,365 B1 | 2/2003 | Powell et al. | |
| 7,332,561 B2 | 2/2008 | Kato et al. | |
| 7,531,617 B2 | 5/2009 | Eng et al. | |
| 7,863,382 B2 * | 1/2011 | Ishii et al. | 525/190 |

FOREIGN PATENT DOCUMENTS

WO    2009/094359    7/2009

OTHER PUBLICATIONS

International Search Report dated Jul. 19, 2011 for corresponding PCT/US2010/055094 to E..I. DuPont.
International Search Report dated Jul. 19, 2011 for PCT/US2010/055084 to E.I. DuPont.
See IDS Certification filed herewith, apprising Examiner of co-owned, related U.S. application, 2010.

* cited by examiner

*Primary Examiner* — Tae H Yoon
(74) *Attorney, Agent, or Firm* — Loretta F. Smith; Otha Weaver; Jarrod Raphael

(57) ABSTRACT

Disclosed is a method including (A) melt blending first components including (a-1) a poly(trimethylene terephthalate) homopolymer or copolymer resin; and (a-2) one or more ionomer polymers or a combination of one or more ionomer polymers and acid polymers; to provide a first melt blend; and (B) melt blending said first melt blend with one or more Group B polymeric toughener(s) selected from the group consisting of an ethylene copolymers of the formula E/X/Y wherein:

E is the radical formed from ethylene;
X is selected from the group consisting of radicals formed from

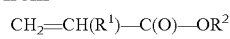
$CH_2{=}CH(R^1){-}C(O){-}OR^2$ Y is one or more radicals formed from selected monomers with the proviso that Y must include at least one radical formed from monomers selected from the group consisting of maleic anhydride, (meth)acrylic acid, maleic acid, maleic acid monoesters, itaconic acid, fumaric acid, fumaric acid monoesters, salts of said preceding acids, and glycidyl acrylate, glycidyl methacrylate, and glycidyl vinyl ether.

7 Claims, 1 Drawing Sheet

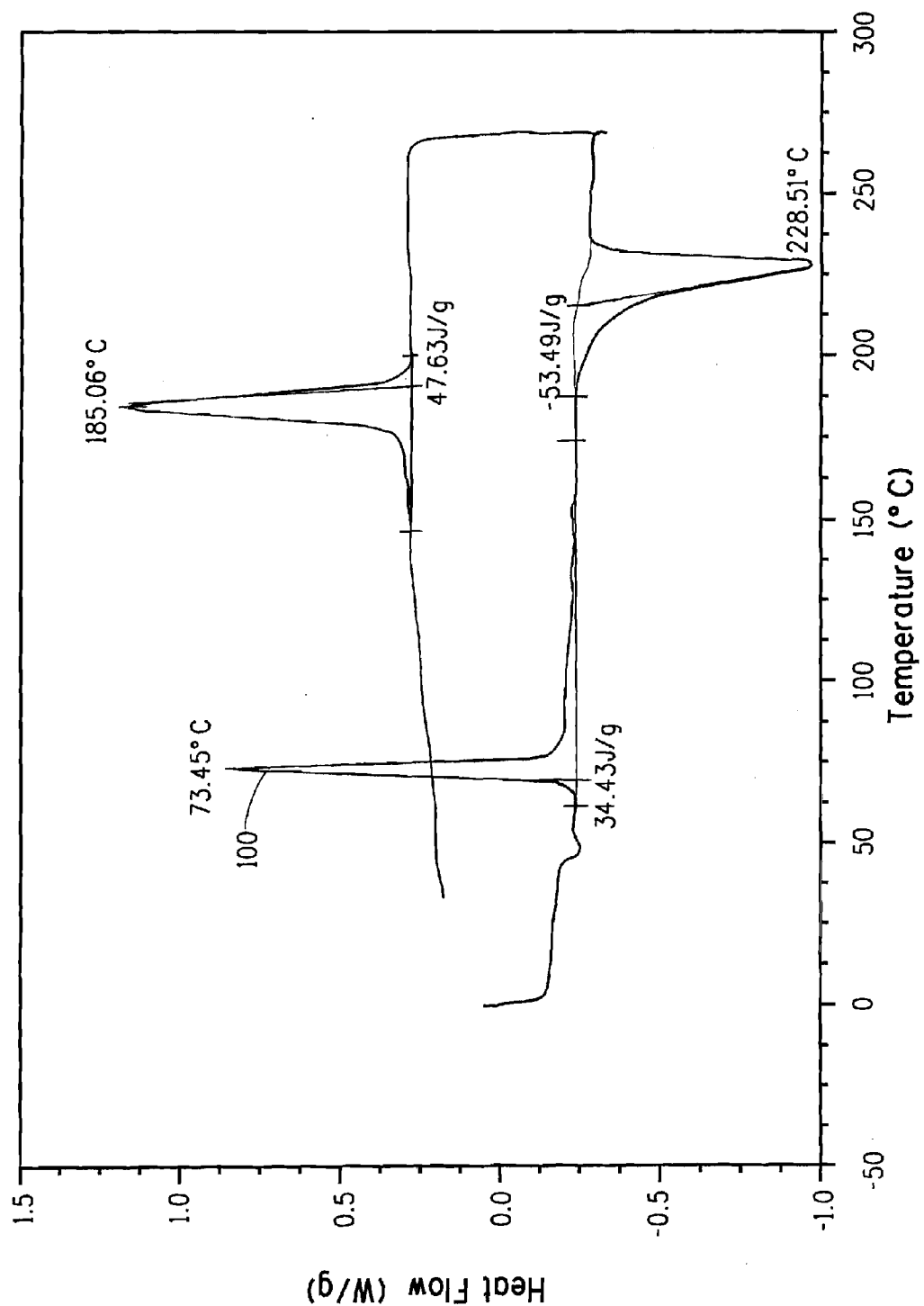

METHOD FOR PROVIDING TOUGHENED POLY(TRIMETHYLENE TEREPHTHALATE) MOLDING RESINS

CROSS REFERENCE TO RELATED APPLICATIONS

This application claims benefit of priority from U.S. Pat. App. No. 61/257,108, filed 2 Nov. 2009, which is currently pending and incorporated herein in its entirety.

FIELD OF INVENTION

This invention is directed to poly(trimethylene terephthalate) resins and methods for toughening.

BACKGROUND OF INVENTION

Thermoplastic polymers are commonly used to manufacture various shaped articles that may be use in applications such as automotive parts, food containers, electrical parts, etc. Shaped articles comprising polyester may be prepared from the molten polymer by a number of melt extrusion processes such as injection molding, compression molding, and blow molding.

Poly(trimethylene) terephthalate (PTT), produced from renewable source of 1,3-propanediol and developed by E. I. du Pont de Nemours & Company (DuPont), is commercially available under Sorona® resin. DuPont pioneered a way to produce the 1,3-propanediol from renewable resources including corn sugar. Sorona® resin has properties including semi-crystalline molecular structure.

It is desirable to develop a thermoplastic polyester composition such as PTT that can be crystallized rapidly from the melt, in order to improve the injection molding processing, and at the same time, improve the hydrolytic stability of the thermoplastic composition.

To increase the crystallization rate of the PTT molding resins, and thus reduce the cycle time of thermoplastic molding processes, nucleating agents usually are added in order to increase the rate of crystallization. Ionomers, which can often act as nucleating agents in polyesters, do not always give desirable results for PTT. Furthermore, other additives, for instance, the reactive polymer tougheners can have unexpected and deleterious affects on the rate of crystallization of PTT.

Needed are processes for preparing compositions that exhibit a combination of performance properties including rapid crystallization, excellent hydrolysis resistance, and high Notched Izod impact resistance in a toughened PTT composition.

SUMMARY OF INVENTION

Disclosed is a method comprising
A) melt blending first components comprising
   (a-1) a poly(trimethylene terephthalate) homopolymer or copolymer resin,
   (a-2) 0.1 to 4 weight % of one or more ionomer polymers or a combination of one or more ionomer polymers and acid copolymers; and
   (a-3) optionally, 0.1 to 20 weight percent one or more organic additives selected from the group consisting of thermoplastic polymers other than said (a-1), lubricants, flow modifiers, plasticizers, heat stabilizers, antioxidants, dyes, pigments, and UV stabilizers;

to provide a first melt blend, wherein the weight percent of (a-2) and (a-3) is based on the total weight of (a-1), (a-2) and (a-3); and
B) melt blending said first melt blend with second components comprising:
   b-1) about 0.5 to about 5 weight percent of one or more Group B polymeric toughener(s) selected from the group consisting of an ethylene copolymers of the formula E/X/Y wherein:
   E is the radical formed from ethylene;
   X is selected from the group consisting of radicals formed from

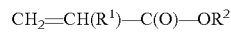
   $CH_2=CH(R^1)-C(O)-OR^2$ wherein $R^1$ is H, $CH_3$ or $C_2H_5$, and $R^2$ is an alkyl group having 1-8 carbon atoms; vinyl acetate; and mixtures thereof; wherein X comprises 0 to 50 weight % of E/X/Y copolymer;
   Y is one or more radicals formed from monomers selected from the group consisting of carbon monoxide, sulfur dioxide, acrylonitrile, maleic anhydride, maleic acid diesters, (meth)acrylic acid, maleic acid, maleic acid monoesters, itaconic acid, fumaric acid, fumaric acid monoesters and salts of said preceding acids, glycidyl acrylate, glycidyl methacrylate, and glycidyl vinyl ether: wherein Y is from 0.5 to 35 weight % of the E/X/Y copolymer, and preferably 0.5-20 weight percent of the E/X/Y copolymer, and E is the remainder weight percent and preferably comprises 40-90 weight percent of the E/X/Y copolymer; with the proviso that Y must include at least one radical formed from monomers selected from the group consisting of maleic anhydride, (meth) acrylic acid, maleic acid, maleic acid monoesters, itaconic acid, fumaric acid, fumaric acid monoesters, salts of said preceding acids, and glycidyl acrylate, glycidyl methacrylate, and glycidyl vinyl ether;
   b-2) optionally, one or more resins selected from the group poly(trimethylene terephthalate) homopolymer or copolymer resin, ionomer polymers and acid copolymers;
   b-3) optionally, one or more organic additives selected from the group consisting of thermoplastic polymers other than said (a-1), lubricants, flow modifiers, plasticizers, heat stabilizers, antioxidants, dyes, pigments, and UV stabilizers;
to provide a second melt blend, wherein the weight percent of (b-1) is based on the total weight of (a-1), (a-2), (a-3), (b-1), (b-2), and (b-3)

BRIEF DESCRIPTION OF THE FIGURES

FIG. 1 shows a DSC scan of a melt quenched sample of a commercial PTT resin exhibiting a large recrystallization exotherm.

DETAILED DESCRIPTION

Herein "copolymer" refers to polymers comprising copolymerized units resulting from copolymerization of two or more comonomers. "Dipolymer" refers to polymers consisting essentially of two comonomer-derived units and "terpolymer" means a copolymer consisting essentially of three comonomer-derived units.

Herein the term "(meth)acrylic" and "(meth)acrylate" encompass acrylic acid and methacrylic acid, and esters of acrylic acid and methacrylic acid, respectively.

The first step (A), melt blending, requires (a-1) a poly(trimethylene terephthalate) homopolymer or copolymer resin. A "poly(trimethylene terephthalate) homopolymer" means any polymer consisting essentially of repeat units of trimethylene terephthalate. A poly(trimethylene terephthalate) homopolymer is substantially derived from the polymerization of 1,3-propanediol with terephthalic acid, or alternatively, derived from the ester-forming equivalents thereof (e.g., any reactants which may be polymerized to ultimately provide a polymer of poly(trimethylene terephthalate). A most preferred resin for practicing the invention is poly(trimethylene terephthalate) homopolymer.

A "poly(trimethylene terephthalate) copolymer" means any polymer comprising, or derived from, at least about 80 mole percent trimethylene terephthalate and the remainder of the polymer being derived from monomers other than terephthalic acid and 1,3-propanediol, or their ester forming equivalents. Examples of poly(trimethylene terephthalate) copolymers include copolyesters synthesized from 3 or more reactants, each having two ester forming groups. For example, a poly(trimethylene terephthalate) copolymer may be prepared by reacting 1,3-propanediol, terephthalic acid, and one or more comonomers selected from linear, cyclic, and branched aliphatic dicarboxylic acids having 4 to 12 carbon atoms such as butanedioic acid, pentanedioic acid, hexanedioic acid, azelaic acid, sebacic acid, dodecanedioic acid, 1,4-cyclohexanedicarboxylic acid, or ester-forming equivalents thereof; aromatic dicarboxylic acids other than terephthalic acid having 8 to 12 carbon atoms such as phthalic acid, isophthalic acid or 2,6-naphthalenedicarboxylic acid; linear, cyclic, and branched aliphatic diols other than 1,3-propanediol having 2 to 8 carbon atoms such as ethanediol, 1,2-propanediol, 1,4-butanediol, hexamethylene glycol, 3-methyl-1,5-pentanediol, 2,2-dimethyl-1,3-propanediol, 2-methyl-1,3-propanediol, cyclohexane dimethanol or 1,4-cyclohexanediol; and aliphatic and aromatic ether glycols having 4 to 10 carbon atoms such as hydroquinone bis(2-hydroxyethyl)ether. Alternatively, a poly(trimethylene terephthalate) copolymer may be prepared from a poly(ethylene ether) glycol having a molecular weight below about 460, such as diethylene ether glycol, methoxypolyalkylene glycol, diethylene glycol, and polyethylene glycol. The comonomer may be present in the copolymer at a level of about 0.5 to about 20 mol %, and may be present at a level of up to about 30 mol %.

Preferred PTT copolymers contain at least about 85 mol %, at least about 90 mol %, at least about 95 mol %, or at least about 98 mol %, of copolymerized units of trimethylene terephthalate. A suitable poly(trimethylene terephthalate) homopolymer for the invention is commercially available under the tradename Sorona® from E.I. du Pont de Nemours and Co., Wilmington, Del. Methods for preparation of PTT are discussed, for example in U.S. Pat. No. 6,277,947 and commonly owned U.S. patent application Ser. No. 11/638,919 (filed 14 Dec. 2006, entitled "Continuous Process for Producing Poly(trimethylene terephthalate)").

Another embodiment of a preferred poly(trimethylene terephthalate) homopolymer or copolymer for the method disclosed herein comprises poly(trimethylene terephthalate) repeat units and end groups, said poly(trimethylene terephthalate homopolymer or copolymer having a cyclic dimer content of less than or equal to 1.1 wt %, as determined with nuclear magnetic resonance analysis, based on the weight of said poly(trimethylene terephthalate repeat units and said cyclic dimer; and said poly(trimethylene terephthalate homopolymer or copolymer having an intrinsic viscosity of about 0.8 to about 2.0 dL/g, preferably about 0.9 to about 1.5 dL/g, and more preferably about 0.9 to about 1.3 dL/g.

For a preferred PTT resin used herein, the cyclic dimer is of the following formula (I)

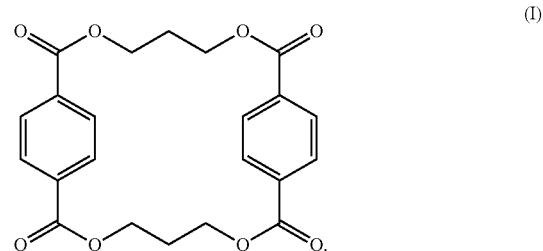 [SMILES: O=C1OCCCOC(=O)c2ccc(cc2)C(=O)OCCCOC(=O)c2ccc1cc2]

For determination of cyclic dimer content, NMR analysis is used herein. The analysis directly measures the content of all terephthalate groups in the polymer repeat units including the terephthalate present in any end groups, and in a separate and distinct region the terepththalate groups of the cyclic dimer. The peak attributed to the cyclic dimer is at about 7.7 ppm, distinct from the PTT terephthalate repeat units at 8.1 ppm.

A PTT resin having a cyclic dimer content of less than or equal to 1.1 wt %, is available by solid state polymerization of PTT comprising:

providing an initial PTT resin composition comprising poly(trimethylene terephthalate) repeat units, in the form of a plurality of pellets having a pellet size of 3.0-4.0 g/100 pellets, said initial PTT resin composition having an initial cyclic dimer content and one or more a condensation catalyst; said initial poly(trimethylene terephthalate) resin composition having an intrinsic viscosity of 0.50 to 0.89 dL/g; and heating and agitating the plurality of resin pellets to a condensation temperature for a condensation time to provide said high viscosity PTT resin having poly(trimethylene terephthalate) repeat units and having a low cyclic dimer content of less than or equal to 1.1 wt % as determined with nuclear magnetic resonance analysis and an intrinsic viscosity in the range of 0.9 to 2.0 dL/g; wherein the cyclic dimer content is based on the weight of said poly(trimethylene terephthalate) repeat units and said cyclic dimer The initial PTT resin has one or more a condensation catalyst, preferably about 25 to about 200 ppm based on the weight of said initial PTT resin composition. A preferred catalyst is titanium (IV) butoxide.

The heating and agitating the plurality of resin pellets to a condensation temperature can be done in a rotary dryer, fluidized bed, or fluidized column reactor in the range of 180° C. and 215° C., and under a reduced pressure of about 0.1 to about 10 mm Hg.

An alternative PTT solid state polymerization process is disclosed in U.S. Pat. No. 7,332,561.

In one embodiment, component (a-1) is present at about 50 to 99.9 weight percent of said first melt blend. In another embodiment, component (a-1) is present at about 76 to about 99.9 weight percent of said first melt blend. In another embodiment said melt blending first components does not include a Group B polymeric toughener, as disclosed below.

The first step, melt blending, requires (a-2) 0.1 to 4 weight percent of one or more ionomer polymers or a combination of one or more ionomer polymers and acid copolymers. The weight percent of (a-2) is based on the total weight of (a-1), (a-2) and (a-3). The term "acid copolymer" as used herein refers to a polymer comprising copolymerized units of an a-olefin, an α,β-ethylenically unsaturated carboxylic acid, and optionally other suitable comonomer(s) such as, an α,β-ethylenically unsaturated carboxylic acid ester.

The term "ionomer" as used herein refers to a polymer that comprises ionic groups that are alkali metal ion carboxylates, for example, sodium carboxylates. Such polymers are generally produced by partially or fully neutralizing the carboxylic acid groups of precursor acid copolymers, as defined herein, for example by reaction with a base. An example of an alkali metal ionomer is a sodium ionomer (or sodium neutralized ionomer), for example a copolymer of ethylene and methacrylic acid wherein all or a portion of the carboxylic acid groups of the copolymerized methacrylic acid units are in the form of sodium carboxylates.

The ionomer polymer comprises an ionomer that is an ionic, neutralized, or partially neutralized, derivative of a precursor acid copolymer. The precursor acid copolymer comprises copolymerized units of an αt-olefin having 2 to 10 carbons and about 5 to about 30 wt %, about 5 to 25 wt %, or about 10 to about 25 wt %, of copolymerized units of an α,β-ethylenically unsaturated carboxylic acid having 3 to 8 carbons, based on the total weight of the precursor acid copolymer.

Suitable α-olefin comonomers include, but are not limited to, ethylene, propylene, 1-butene, 1-pentene, 1-hexene, 1-heptene, 3 methyl-1-butene, 4-methyl-1-pentene, and the like and mixtures of two or more of these α-olefins. Preferably, the α-olefin is ethylene.

Suitable α,β-ethylenically unsaturated carboxylic acid comonomers include, but are not limited to, (meth)acrylic acids, itaconic acids, maleic acids, maleic anhydrides, fumaric acids, monomethyl maleic acids, and mixtures of two or more of these acid comonomers. Preferably, the α,β-ethylenically unsaturated carboxylic acid is selected from (meth)acrylic acid.

The precursor acid copolymers may further comprise copolymerized units of other comonomer(s), such as unsaturated carboxylic acids having 2 to 10, or preferably 3 to 8 carbons, or derivatives thereof. Suitable acid derivatives include acid anhydrides, amides, and esters. Esters are preferred. Specific examples of preferred esters of unsaturated carboxylic acids include, but are not limited to, methyl (meth)acrylates, ethyl (meth)acrylates, propyl (meth)acrylates, isopropyl (meth)acrylates, butyl (meth)acrylates, isobutyl (meth)acrylates, tert-butyl (meth)acrylates, octyl (meth)acrylates, undecyl (meth)acrylates, octadecyl (meth)acrylates, dodecyl (meth)acrylates, 2-ethylhexyl (meth)acrylates, isobornyl (meth)acrylates, lauryl (meth)acrylates, 2-hydroxyethyl (meth)acrylates, glycidyl (meth)acrylates, poly(ethylene glycol)(meth)acrylates, poly(ethylene glycol) methyl ether (meth)acrylates, poly(ethylene glycol) behenyl ether (meth)acrylates, poly(ethylene glycol) 4-nonylphenyl ether (meth)acrylates, poly(ethylene glycol) phenyl ether (meth)acrylates, dimethyl maleates, diethyl maleates, dibutyl maleates, dimethyl fumarates, diethyl fumarates, dibutyl fumarates, dimethyl fumarates, vinyl acetates, vinyl propionates, and mixtures of two or more thereof. Examples of preferable suitable comonomers include, but are not limited to, methyl (meth)acrylates, butyl (meth)acrylates, glycidyl (meth)acrylates, vinyl acetates, and mixtures of two or more thereof. Preferably, however, the precursor acid copolymer does not incorporate other comonomers in any significant amount.

Mixtures of precursor acid copolymers are also suitable, provided that the properties of the copolymers are within the ranges described herein. For example, two or more dipolymers having differing amounts of copolymerized carboxylic acid comonomer or differing melt indices may be used. Also, a mixture of precursor acid copolymers including a dipolymer and a terpolymer may be suitable.

The precursor acid copolymer may have a melt flow rate (MFR) of about 10 to about 1000 g/10 min, or about 20 to about 500 g/10 min, or about 40 to about 300 g/10 min, or about 50 to about 250 g/10 min, as determined in accordance with ASTM method D1238 at 190° C. and 2.16 kg.

To obtain the ionomers useful in the ionomer compositions described herein, the precursor acid copolymers are neutralized with a base so that the carboxylic acid groups in the precursor acid copolymer react to form carboxylate groups. Preferably, the precursor acid copolymers groups are neutralized to a level of about 40% to about 90%, or about 40% to about 70%, or about 43% to about 60%, based on the total carboxylic acid content of the precursor acid copolymers as calculated or measured for the non-neutralized precursor acid copolymers.

Although any stable cation is believed to be suitable as a counterion to the carboxylate groups in an ionomer, for making the compositions of the invention monovalent cations, such as cations of alkali metals, are preferred. Still more preferably, the base is a sodium ion-containing base, to provide a sodium ionomer wherein about 40% to about 90%, or about 40% to about 70%, or about 43% to about 60% of the hydrogen atoms of the carboxylic acid groups of the precursor acid are replaced by sodium cations. The particular level of neutralization of the ionomer is referred to as the neutralization ratio.

In one embodiment, the one or more ionomer polymers comprise an ethylene/methacrylic acid copolymer having about 5 to 25 wt % methacrylic acid repeat units based on the weight of the ethylene/methacrylic acid copolymer; and more particularly, the ethylene/methacrylic acid copolymer has a neutralization ratio of 0.40 to about 0.70.

To obtain the ionomers used herein, the precursor acid copolymers may be neutralized by any conventional procedure, such as those disclosed in U.S. Pat. Nos. 3,404,134 and 6,518,365.

The as-neutralized ionomer may have a MFR of about 0.1 to about 50 g/10 min or less, or about 0.2 to about 30 g/10 min or less, or about 0.3 to about 25 g/10 min, or about 0.5 to about 10 g/10 min, or about 0.6 to about 5 g/10 min, as determined in accordance with ASTM method D1238 at 190° C. and 2.16 kg.

The first step melt blending, may have present (a-3), optionally, one or more organic additives selected from the group consisting of thermoplastic polymers other than PTT, lubricants, flow modifiers, plasticizers, heat stabilizers, antioxidants, dyes, pigments, and UV stabilizers. Preferably the first step melt blending has 0.1 to about 20 weight percent of one or more organic additives, based on the total weight of (a-1), (a-2) and (a-3). The term "wherein the weight percent of (a-2) and (a-3) is based on the total weight of (a-1), (a-2) and (a-3)" means that the total weight of (a-1), (a-2) and (a-3) is exclusive of any fillers that may be present in said melt blending first components.

The thermoplastic polymers other than (a-1) include polymers selected from the group consisting of polyesters, for instance, poly(ethylene terephthalate) (PET), poly(butylene terephthalate) (PBT), PET copolymer, PBT copolymer, poly(hydroxylalkanoic) (PHA) polymers, for instance poly(lactic acid) (PLA), poly(glycolic acid), poly(hydroxy-butyric acid), poly(6-hydroxyhexanoic acid), poly(3-hydroxyhexanoic acid), poly(4-hydroxyhexanoic acid) poly(3-hydroxyheptanoic acid), polyetheresters, polyetheramides, polyetheresteramides, polyamides, polycarbonates, and Group A polymeric tougheners selected from the group consisting of polyolefins including polyethylene, polypropylene, ethylene/alpha-olefin copolymers and ethylene/propylene/diene rubbers; ethylene copolymers; copolyetherester elastomers; and blends selected from the group consisting of polyolefins and ethylene copolymers.

Group A polymeric tougheners are referred to as non-interfering tougheners, that is, they do not have functionality, such as acids, acid salts, acid anhydrides, or epoxide functional groups that, react with (a-1) components, or affect the alkali carboxylate factor (ACF, as disclosed below) of the first melt bend or second melt blend, other than by dilution. The term "other than by dilution" means that the presence of Group A polymeric tougheners may affect the total weight of the first melt blend or second melt blend, and thus, have some influence on the ACF value, because the total weight of components (a-1), (a-2) and (a-3) is used in the calculation of ACF value (see below).

Within Group A polymeric tougheners, the term "polyolefins" include low density polyethylene (LDPE), high density polyethylene (HDPE), ethylene/octene copolymer and ethylene/propylene/diene (EPDM) rubbers.

Within Group A polymeric tougheners, the term "ethylene copolymer" includes polymers comprising radicals from the polymerization of ethylene and one or more other ethylenically unsaturated monomer(s) as disclosed in (i) and (ii) below. Ethylene copolymers useful as non-interfering tougheners are selected from the group consisting of:

i) an ethylene copolymer of the formula E/X where
E is the radical formed from ethylene and comprises 40-90 weight percent of the ethylene copolymer;
X is one or more radicals formed from

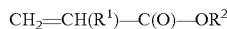

wherein $R^1$ is H, $CH_3$ or $C_2H_5$, preferably H or $CH_3$, and most preferably H; $R^2$ is an alkyl group having 1-8 carbon atoms; vinyl acetate; or a mixture thereof; and wherein
X comprises 10-60 weight percent; and
ii) an ethylene copolymer of the formula $E/X/Y^1$
wherein E and X are as described above, and $Y^1$ is a radical formed from monomers selected from the group consisting of acrylonitrile, methacrylonitrile; styrene and carbon monoxide; wherein E is 40-89.5 weight percent; X comprises 10-40 weight percent, and $Y^1$ comprises 0.5-20 weight percent, of the ethylene copolymer.

Preferably $Y^1$ is formed from carbon monoxide. Preferably X comprises 15-35 wt %, and most preferably 20-35 wt % of the ethylene copolymer, and $Y^1$ comprises 0.5-20 wt %, preferably 2.0-12 wt %, and most preferably 3-8 wt %, of the ethylene copolymer.

The copolyetherester elastomers useful as Group A polymeric tougheners are such as is disclosed in U.S. Pat. Nos. 3,766,146, 4,014,624 and 4,725,481. These patents disclose a segmented thermoplastic copolyetherester elastomer containing recurring polymeric long chain ester units derived from carboxylic acids and long chain glycols and short chain ester units derived from dicarboxylic acids and low molecular weight diols. The long chain ester units form the soft segment of the copolyetherester elastomer, and the short chain ester units form the hard segment.

More specifically, such copolyetherester elastomers may comprise a multiplicity of recurring intralinear long chain and short chain ester units connected head-to-tail through ester linkages, said long chain ester units being represented by the formula:

—OGO—C(O)RC(O)—                           (I)

and said short-chain ester units being represented by the formula:

—ODO—C(O)RC(O)—                           (II)

wherein:
G is a divalent radical remaining after removal of terminal hydroxyl groups from poly(alkylene oxide) glycols, having a carbon to oxygen ratio of about 2.0-4.3, a molecular weight above about 200 and a melting point below about 60° C. The one or more poly(alkylene oxide)glycols useful in forming the G segment include poly(ethylene oxide)glycol, poly(1,2- or 1,3-propylene oxide)glycol, poly(tetramethylene oxide) glycol, poly(hexamethylene oxide)glycol, an ethylene oxide-propylene oxide block or random copolymer, an ethylene oxide-tetrahydrofuran block or random copolymer, etc. Of these poly(alkylene oxide)glycols, poly(ethylene oxide)glycol is preferable. The number-average molecular weight of the poly(alkylene oxide)glycol is preferably 200-6,000, more preferably 400-4,000.

R is a divalent radical remaining after removal of carboxyl groups from a dicarboxylic acid having a molecular weight less than about 300; and D is a divalent radical remaining after removal of hydroxyl groups from a low molecular weight diol having a molecular weight less than about 250.

The term "long chain ester units" as applied to units in a polymer chain refers to the reaction product of long chain glycol with a dicarboxylic acid. Such "long chain ester units", which are a repeating unit in the copolyesters, correspond to the formula (I) above. The long chain glycols are polymeric glycols having terminal (or as nearly terminal as possible) hydroxyl groups and a molecular weight above about 200 and preferably from about 400-4000. The long chain glycols used to prepare the copolyesters are poly(alkylene oxide) glycols as disclosed above.

The term "short chain ester units" as applied to units in a polymer chain refers to low molecular weight compounds or polymer chain units having molecular weights less than about 550. They are made by treating a low molecular weight diol (below about 250) with a dicarboxylic acid to form ester units represented by formula (II) above.

Included among the low molecular weight diols which react to form short chain ester units are acyclic, alicyclic and aromatic dihydroxyl compounds, an example of which is 1,4-butanediol. Dicarboxylic acids which are reacted with the foregoing long chain glycols and low molecular weight diols to produce the copolyesters of this invention are aliphatic, cycloaliphatic or aromatic dicarboxylic acids of low molecular weight, that is, having a molecular weight of less than about 300, an example of which is terephthalic acid.

Examples of specific copolyetherester elastomers useful in the invention are the Hytrel® elastomers available from E.I. du Pont de Nemours and Company, Wilmington, Del.

Antioxidants useful in the invention are hindered phenol compounds including, for example, tetrakis (methylene (3,5-di-(tert)-butyl-4-hydroxyhydrocinnamate)) methane available commercially as Irganox® 1010 and Irganox 1076, both available from CIBA Specialty Chemicals, Tarrytown, N.Y. Other antioxidants are phosphites Ultranox® 626 and Westin® 619, available from GE Specialty Chemical, Morgantown, W. Va., Irgafos® 168 (Tris(2,4-ditert-butylphenyl)phosphite) available from CIBA Specialty Chemicals and Adekastab® P-EPQ and Adekastab® PEP-36 available from Adeka Corporation Tokyo 116-8554, Japan Lubricants useful in the invention are Loxiol PTS HOB 7119 available from Cognis, and Licomont ET 132, Licomont ET141, and Licomont wax OP available from Clariant Corp., Charlotte, N.C.

The first step melt blending, in addition to components (a-1), (a-2) and (a-3), may include, 0 to 50 weight % of one or more fillers, based on the total weight of the first melt blend. The filler is any material commonly used in thermoplastic compositions, such as reinforcing agents, and other fillers. The filler may or may not have a coating on it, for example, a sizing and/or a coating to improve adhesion of the filler to the polymers of the composition. Useful fillers are those selected from the group consisting of minerals such as clay, sepiolite, talc, wollastonite, mica, and calcium carbonate; glass in various forms such as fibers, milled glass, solid or hollow glass spheres; carbon as black or fiber; titanium dioxide; aramid in the form of short fibers, fibrils or fibrids; flame retardants such as antimony oxide, sodium antimonate, and a combination of two or more thereof. In various embodiments the first melt blend further comprises one or more fillers at about 1 to about 50 weight percent, and preferably about 15 to about 45 weight percent, based on the total weight of the first melt blend. In various embodiments fillers are wollastonite, mica, talc, glass especially glass fiber, titanium dioxide, and calcium carbonate.

Step (B), melt blending, requires (b-1) about 0.5 to about 5 weight percent of one or more Group B polymeric toughener(s) selected from the group consisting of an ethylene copolymers of the formula E/X/Y wherein:

E is the radical formed from ethylene;

X is selected from the group consisting of radicals formed from $$CH_2=CH(R^1)-C(O)-OR^2$$

wherein $R^1$ is H, $CH_3$ or $C_2H_5$, preferably H or $CH_3$, and most preferably H; $R^2$ is an alkyl group having 1-8 carbon atoms; vinyl acetate; or a mixture thereof; wherein X comprises 0 to 50 weight % of E/X/Y copolymer, and preferably 10-40 weight percent of the E/X/Y copolymer;

Y is one or more radicals formed from monomers selected from the group consisting of carbon monoxide, sulfur dioxide, acrylonitrile, maleic anhydride, maleic acid diesters, (meth)acrylic acid, maleic acid, maleic acid monoesters, itaconic acid, fumaric acid, fumaric acid monoesters and salts of said preceding acids, glycidyl acrylate, glycidyl methacrylate, and glycidyl vinyl ether: wherein Y is from 0.5 to 35 weight % of the E/X/Y copolymer, and preferably 0.5-20 weight percent of the E/X/Y copolymer, and E is the remainder weight percent and preferably comprises 40-90 weight percent of the E/X/Y copolymer; with the proviso that Y must include at least one radical formed from monomers selected from the group consisting of maleic anhydride, (meth)acrylic acid, maleic acid, maleic acid monoesters, itaconic acid, fumaric acid, fumaric acid monoesters, salts of said preceding acids, and glycidyl acrylate, glycidyl methacrylate, and glycidyl vinyl ether.

In one embodiment said one or more Group B polymeric toughener(s) is selected from the group consisting of an ethylene copolymers of the formula E/X/Y wherein Y comprises glycidyl acrylate, glycidyl methacrylate, and glycidyl vinyl ether.

The ethylene copolymer of the formula E/X/Y used in the composition of the present invention are random copolymers that can be prepared by direct polymerization of the foregoing monomers in the presence of a free-radical polymerization initiator at elevated temperatures, about 100 to about 270° C. or about 130 to about 230° C., and at elevated pressures, at least about 70 MPa or about 140 to about 350 MPa. The ethylene copolymers may also be prepared using a tubular process, an autoclave, or a combination thereof, or other suitable processes. The ethylene copolymers may be not fully uniform in repeat unit composition throughout the polymer chain due to imperfect mixing during polymerization or variable monomer concentrations during the course of the polymerization. The ethylene copolymers are not grafted or otherwise modified post-polymerization.

Step (B), melt blending, may have present (b-2), optionally, one or more resins selected from the group poly(trimethylene terephthalate) homopolymer or copolymer resin, ionomer polymers and acid copolymers; as disclosed above.

Step (B), melt blending, may have present (b-3), optionally, one or more organic additives selected from the group consisting of thermoplastic polymers other than PTT (as disclosed above), lubricants, flow modifiers, plasticizers, heat stabilizers, antioxidants, dyes, pigments, and UV stabilizers; as disclosed above.

Step (B), in addition to components (b-1), (b-2) and (b-3), may include, 0 to 50 weight percent of one or more fillers, as disclosed above, based on the total weight of the second melt blend. In various embodiments the second melt blend includes one or more fillers at about 1 to about 50 weight percent, and preferably about 15 to about 45 weight percent; based on the total weight of the second melt blend. In various embodiments fillers are wollastonite, mica, talc, glass especially glass fiber, titanium dioxide, and calcium carbonate.

In step (B) melt blending, the weight percent of (b-1) is based on the total weight of (a-1), (a-2), (a-3), (b-1), (b-2), and (b-3).

In one embodiment Group A polymeric tougheners are present in about 0.5 to about 5 weight percent and preferably 0.5 to 3 weight percent, based on the total weight of components (a-1), (a-2), (a-3), (b-1), (b-2), and (b-3).

In a preferred embodiment, in said first melt blend, said one or more ionomer polymers and/or one or more ionomer polymers and acid copolymers have $C_3$ to $C_8$ carboxylic acid repeat units, and each ionomer and acid copolymer have:

a weight percent, W, based on the weight of components (a-1), (a-2) and (a-3);

a weight fraction of $C_3$ to $C_8$ carboxylic acid repeat units, Z, based on the weight of each ionomer or acid copolymer; and a neutralization ratio, N, equal to any value from 0 to 1.0; wherein said neutralization ratio N is the mol fraction of said carboxylic acid repeat units neutralized as an alkali metal salt, based on the total carboxylic acid repeat units in said ionomer and acid copolymers; and said first melt blend has an alkali carboxylate factor, ACF, of 4 to about 14, and preferably about 4 to 12;

wherein said ACF is defined by the formula:

$$ACF=\Sigma_{a-i}[(W \cdot Z \cdot N)_{a-i}(W \cdot N)_{a-i} \cdot 100/\Sigma_{a-i}(W)_{a-i}]$$

The term $(W \cdot Z \cdot N)_{a-i}$ is referred to a the alkali carboxylate level; and the term $(W \cdot N)_{a-i}/\Sigma_{a-i}(W)_{a-i}$ is the weight averaged neutralization ratio for the composition; wherein each ionomer polymer and acid copolymer present in a composition is represented by a consecutive letter a-i. The sum contribution of all the individual ionomer polymers and acid copolymers gives the ACF number. However, the acid copolymers, by definition, have a neutralization ratio of 0, and thus only contribute to the $\Sigma_{a-i}(W)_{a-i}$ term in formula (I). Thus, it is clear that the ACF can be influenced by the presence and amount of acid copolymer in the molding resin. Since each ionomer and acid polymer weight percent W is based on only the weight of components (a-1), (a-2) and (a-3), the presence of filler has no affect on the ACF value of the first melt blend.

Typically conventional PTT resins crystallize relatively slowly from the melt. To assess the ability of a particular resin composition to crystallize, the composition is typically melted under controlled isothermal conditions, and then the melt sample is cooled rapidly by immersing the melt sample in liquid nitrogen. This is known as "melt-quenching" or providing a "melt quenched sample." FIG. 1 shows a typical DSC scan of a melt quenched sample of a commercial PTT resin without added ionomer compositions. The scan was initiated at 0° C.; heated at 10° C./min scan rate through a recrystallization exotherm (100).

The recrystallization exotherm is a measure in Joules/gram (J/g) sample of how much crystallization of the PTT composition has not occurred in the quenching process. Large exotherms indicate that the PTT composition crystallization is relatively slow and a large fraction of the PTT did not crystallize in the quench. Large exotherms are considered an undesired attribute in molding resins. Very small recrystallization exotherms, indicative of high degrees of crystallization during quench, are highly desirable for molding resins.

The following discussion illustrates the invention in the Examples with regard to the recrystallization:

Comparative Example C-1, having an ionomer resin present and an ACF value of 5.22, exhibits a recrystallization peak of 2.5 J/g, indicating rapid crystallization upon melt-quenching.

Comparative Example C-2 having a similar composition to C-1, with an ACF value of 5.22, but with Group B polymeric toughener (1.5 wt %) added in the rear of the extruder with all other components, exhibits a recrystallization peak of 17.3 J/g, indicating slow crystallization upon melt-quenching. This comparative example illustrates that the Group B polymeric toughener affects the crystallization kinetics of the PTT/ionomer composition when a one-step melt blending method is used.

Example 2 having a similar composition to C-2 with an ACF value of 5.22, but with Group B polymeric toughener (1.5 wt %) added in the side of the extruder, exhibits a recrystallization peak of 2.8 J/g, indicating rapid crystallization upon melt-quenching. This Example illustrates that the negative affect that Group B polymeric toughener has on the crystallization kinetics can be almost completely mitigated by adding the Group B polymeric toughener to a preformed PTT/ionomer melt blend.

One embodiment is a method providing a second melt blend, as disclosed above, having a recrystallization peak of less than 5 J/g as measured with Differential Scanning calorimetry (DSC) at 10° C./min scan rate from a melt quenched sample.

Another important attribute of the PTT resins that has to be considered for many applications, is the hydrolysis resistance of the molded parts derived from the thermoplastic compositions. Hydrolysis resistance is assessed herein by treating the molded parts of the thermoplastic composition in a Pressure Cooker Test at elevated temperature and pressure for a period of time up to 30 hours. The tensile strength and elongation to break are then determined for the treated samples and compared to those of untreated samples to determine the % retention of tensile strength and elongation to break.

In one embodiment is a method providing a second melt blend, as disclosed above, having greater than about 70% and preferably greater than 90% tensile strength retention after a Pressure Cooker Test for 30 h at 121° C. and 2 atm, relative to an untreated molded article, as measured with ISO method 527-1/2.

The melt blending steps (A) and (B) may be performed with any melt blending method. The term "melt blending" means that the component materials are mixed at a temperature sufficient to melt the organic polymer components of the first and second melt blending steps, to provide a homogeneously dispersed mixture. Fillers and polymeric tougheners are homogeneously dispersed, but remain as discreet phases. Melt blending can be accomplished with any melt-mixer such as a single or twin-screw extruder, blender, kneader, Banbury mixer, etc. to give the first and second melt blends. The first melt blend can be extruded, cooled, and chopped into pellets, or the first melt blend can be prepared and the additional components for the second melt blending step then added and further melt-mixed until homogeneous.

Preferably the first melt blending and second melt blending are performed, without cooling said first melt blend, in an extruder. The first melt blend is prepared by adding first components to the rear of an extruder; and side-feeding the second components, (b-1), and optionally (b-2), (b-3), and filler.

The second met blend may be formed into articles using methods known to those skilled in the art, such as, for example, injection molding. Such articles can include those for use in electrical and electronic applications, mechanical machine parts, and automotive applications. Various embodiments of the invention are molded articles provided by the injection molding of the poly(trimethylene terephthalate) resin compositions provided by the method of the invention.

In all Embodiments, Comparative Examples and Examples:

a low recrystallization peak exotherm, e.g. less than 5 J/g, indicates that the composition crystallizes rapidly and is a desirable property;

a high Notched Izod impact, greater than 4.0 KJ/m$^2$, and preferably greater than 4.5 KJ/m$^2$, indicates the composition has favorable impact resistance;

a high % Retention of tensile strength (TS), e.g. greater than 80%, preferably greater than 90%, and most preferably greater than 95%, indicates the composition has favorable hydrolysis resistance under the 30 hour pressure cooker test.

Materials

Sorona® Bright PTT resin was available from E. I. du Pont de Nemours & Co., Inc. Wilmington, Del., USA, having an IV of 1.02 dL/g and 2.7 wt % cyclic dimer The following processes were used to prepare various PTT resins used in the examples.

PTT-A PTT resin (15.0 Kg) provided from continuous polymerization of 1,3-propanediol with terephthalic acid in the presence of titanium (IV) n-butoxide (100 ppm) having 33±2 mg per pellet with dimensions 2.9±0.2×2.8±0.2×4.1±0.2 mm, with an intrinsic viscosity of 0.61 dL/g, and with a PTT cyclic dimer concentration of 2.5 weight %, was charged to a dual cone tumble drier (#36 Conaform rotary dryer, Patterson Industries, Toccoa Ga. USA). The tumble drier was rotated at a rate of 6 revolutions per minute while heating at a rate of 36° C./h up to 205° C. under vacuum 1.8 mm Hg (240 Pa) and nitrogen 3.7 L/min. The temperature of the drier was held at 202±2° C. for 14 hours. The dryer was cooled under vacuum until pellet temperature reached 37° C.; the vacuum was broken with nitrogen and the reactor was packed out under positive nitrogen pressure. The dryer was cooled at a rate of 40° C./h to provide PTT-A pellets having an intrinsic viscosity (IV) of 0.88 dL/g; and a cyclic dimer content of about 0.85 wt %.

PTT-C was a mixture of dry blended pellets of Sorona® Bright PTT resin (IV 1.02 dL/g, 70 parts) and PTT-A pellets (IV 0.88 dL/g, 30 parts) having an IV of 0.92 dL/g.

PTT-E PTT resin (15 Kg of pellets), provided from continuous polymerization of 1,3-propanediol with terephthalic acid in the presence of titanium (IV) n-butoxide (100 ppm) having 33±2 mg per pellet with dimensions 2.9±0.2×2.8±0.2×4.1±0.2 mm, with an inherent viscosity of 0.61 dL/g, and with a PTT cyclic dimer concentration of 2.5 weight %, was charged to a dual cone tumble drier ((#36 Conaform rotary dryer, Serial #84-MX-0214. Built in 1984 by Patterson Industries, Toccoa Ga. USA) The tumble drier was rotated at a rate of 6 revolutions per minute while heating at a rate of 36° C./h up to 205° C. under vacuum 1.8 mm Hg (240 Pa) and nitrogen 3.7 L/min. The temperature of the drier was held at 202±2° C. for 27 h. The dryer was cooled under vacuum until pellet temperature reached 37° C.; the vacuum was broken with nitrogen and the reactor was packed out under positive nitrogen pressure. The dryer was cooled at a rate of 40° C./h to provide the solid phase polymerization pellets having an intrinsic viscosity (IV) of 0.976 dL/g.

PTT-F PTT resin (4680 Kg of pellets), provided from continuous polymerization of 1,3-propanediol with dimethyl terephthalate in the presence of titanium (IV) n-butoxide (100 ppm) having 33±2 mg per pellet with dimensions 2.9±0.2×2.8±0.2×4.1±0.2 mm, with an inherent viscosity of 0.76 dL/g, and with a PTT cyclic dimer concentration of 2.5 weight %, was charged to a dual cone tumble drier (ABBE rotating dryer, model 24, Patterson, N.J., USA) The tumble drier was rotated at a rate of 4 revolutions per minute while heating at a rate of 12° C./h up to 205° C. The heating occurred under vacuum (0.65 mm Hg). The temperature of the drier was held at 207±2° C. for 10 hours. The dryer was cooled under vacuum until pellet temperature reached 60° C.; the vacuum was broken with nitrogen and the reactor was packed out under positive nitrogen pressure. The dryer was cooled at a rate of 22° C./h. The cyclic dimer concentration was measured after cool down. The cyclic dimer concentration was 0.88 weight % and the intrinsic viscosity (IV) was 1.04 dL/g.

Ionomer-B resin is a neutralized ethylene-methacrylic acid copolymer (15 wt % MAA, 59 mol % Na neutralized).

NT-4 is an ethylene/n-butyl acrylate copolymer with 27 wt % n-butyl acrylate, available from E.I. du Pont de Nemours and Company, Wilmington, Del.

Toughener B-1 is a terpolymer of ethylene, 66.7 wt. %, n-butyl acrylate, 28 wt. %, and glycidyl methacrylate, 5.3 wt. % with a melt index of 12, available from E.I. du Pont de Nemours and Company, Wilmington, Del.

Toughener B-2 is an ethylene/maleic acid monoethyl ester (MAME) copolymer (9.3% MAME) available from E.I. du Pont de Nemours and Company, Wilmington, Del.

Irganox® 1010 antioxidant is available from Ciba Specialty Chemicals, Inc., Tarrytown, N.Y.

Loxiol PTS HOB7119 is a pentaerythritol tetrastearate available from Cognis.

Methods

Sample Preparation and Physical Testing

The compositions of the Examples and Comparative Examples were molded into 4 mm ISO all-purpose bars. The test pieces were used to measure mechanical properties on samples at 23° C. and dry as molded. The following test procedures were used and the results are given in Table 1-4:
Tensile strength and elongation at break: ISO 527-1/2
Notched Izod impact ISO 180-1A
Pressure Cooker Test Test bars were also conditioned in an autoclave at 121° C., 2 atm, and 100% relative humidity for 30 hours. Mechanical properties were measured on the conditioned test bars and the results were compared to the properties of the unconditioned bars. The mechanical properties of the conditioned bars and the percentage retention of the physical properties are given in Tables 1-3. A greater retention of physical properties indicates better hydrolysis resistance.

Intrinsic Viscosity

The intrinsic viscosity (IV) of the PTT resin was determined using viscosity measured with a Viscotek Forced Flow Viscometer Y-501 (Viscotek Corporation, Houston, Tex.) for the polymers dissolved in 50/50 weight % trifluoroacetic acid/methylene chloride at a 0.4 grams/dL concentration at 19° C. following an automated method based on ASTM D 5225-92. The measured viscosity was then correlated with standard viscosities in 60/40 wt % phenol/1,1,2,2-tetrachloroethane as determined by ASTM D 4603-96 to arrive at the reported intrinsic values.

Determination of Cyclic Dimer Content by NMR 4-6 pellets of PTT were melt pressed at 260° C. and melted for 5 minutes and subsequently pressed to 10,000 lbs of pressure to create a thin film (0.14 mm thick) to increase the surface area of the polymer for easy dissolution. The pressed film of polymer (15 mg) was added to $CDCl_3$/TFA-d (5:1, 1 mL) mixture and dissolved. The solution was transferred to a 5 mm NMR tube and analyzed within one hour of sample preparation. 64 scans were run at 30° C. with a 16 second delay time on a Varian INOVA 500 MHz NMR with a proton/fluorine/carbon probe. The obtained spectrum was integrated at the terephthalate region (8.1 ppm) and the cyclic dimer region (7.65 ppm). The weight percent of cyclic dimer is calculated by dividing the integration value of the cyclic dimer region by the sum of the integration values of the cyclic dimer region and the terephthalate region multiplied by 100.

Differential Scanning Calorimetry (DSC)

A Differential scanning calorimeter, TA Instruments Q1000 MDSC (Modulated DSC) operating in "Standard Mode" was used to determine the recrystallization peak in a melt quenched sample of the thermoplastic composition. A 10-12 mg sample of the composition was weighed into an aluminum DSC pan and the sample heated to 270° C. in a DSC for 10 minutes under nitrogen atmosphere to provide an equilibrated melt sample. The melt sample was removed from the DSC and quick quenched by immersing the sample in liquid nitrogen. The melt quenched sample was equilibrated at 0° C. in the DSC under nitrogen atmosphere, followed by heating at 10° C./min scan rate to 270° C.; held at isothermal for 3 min at 270° C., and cooled at 10° C./min scan rate to 30° C.; while recording the thermal events. The recrystallization peak is the first exothermic peak exhibited in the heating cycle, having a peak height maximum at about 65-75° C. The enthalpy of the recrystallization peak was measured in Joules per gram (J/g).

COMPARATIVE EXAMPLES C-1-C-5

Comparative Examples C-1-C5 illustrate the affect reactive tougheners have in combination with PTT and ionomers.

Components listed in Tables 1 for Comparative Examples 1-5 were combined and fed to the rear of a ZSK 30 mm twin screw extruder and melt mixed using at a melt temperature of about 260° C. to yield a melt blended composition. Exiting the extruder, the compositions were passed through a die to form strands that were cooled and solidified in a quench tank and subsequently chopped to form pellets.

The compositions were molded into test specimens and tested according to the methods outlined above.

Comparative Example C-1 was a PTT composition containing Ionomer B having a low recrystallization exotherm peak (2.5 J/g) but undesirably low Notched Izod impact, and low % retention of TS (55%) under the 30 hour pressure cooker test.

Comparative Example 2-5, exemplify a one step process wherein reactive tougheners Toughener B-1 and/or Toughener B-2 were melt blended with a PTT composition including Ionomer B, wherein the reactive tougheners were fed into the rear of the extruder with all other components. The addition of the reactive tougheners gave improvements in Notched Izod impact, and higher % retention of TS under the 30 hour pressure cooker test than the C-1 control. However, the recrystallization peak exotherms ranging from 6.8 to 26.2 J/g were significantly higher than the C-1 control.

TABLE 1

| | Example No. | | | | |
|---|---|---|---|---|---|
| | C-1 | C-2 | C-3 | C-4 | C-5 |
| Rear fed | | | | | |
| PTT-C (0.92 IV) | 98.3 | 96.8 | 97.8 | 96.8 | 96.8 |
| Irganox ® 1010 | 0.2 | 0.20 | 0.20 | 0.20 | 0.20 |
| Ionomer-B | 1.00 | 1.00 | 1.00 | 1.00 | 1.00 |
| Loxiol PTS HOB7119 | 0.50 | 0.50 | 0.50 | 0.50 | 0.50 |
| Toughener B-1 | | 1.50 | | | 1.00 |
| Toughener B-2 | | | 0.50 | 1.50 | 0.50 |
| Properties | | | | | |
| Tensile Strength (Mpa) | 66.5 | 64 | 66 | 65 | 66 |
| Elongation at Break (%) | 4.7 | 16.8 | 7.5 | 17.2 | 17.1 |
| Tensile Strength (Mpa) 30 h PCT | 36.9 | 62.1 | 59 | 62.3 | 63.1 |
| Elongation at Break (%) 30 h PCT | 1.42 | 6.2 | 2.9 | 10.8 | 11.2 |
| 30 h PCT TS retention (%) | 55 | 97 | 89 | 96 | 95 |

TABLE 1-continued

| | Example No. | | | | |
|---|---|---|---|---|---|
| | C-1 | C-2 | C-3 | C-4 | C-5 |
| 30 h PCT El retention (%) | 30 | 37 | 39 | 63 | 65 |
| Notched Izod (KJ/m$^2$) | 2.8 | 3.7 | 3.1 | 4.2 | 4.3 |
| Recrystallization peak (J/g) | 2.5 | 17.3 | 6.80 | 26.20 | 22.60 |
| Sum of alkali carboxylate level | 0.0885 | 0.0885 | 0.0885 | 0.0885 | 0.0885 |
| Weight Averaged Neutalization Ratio × 100 | 59.0 | 59.0 | 51.2 | 40.2 | 51.2 |
| ACF | 5.2215 | 5.2215 | 3.481 | 2.0886 | 3.481 |

ACF = alkali carboxylate factor calculated from formula 1.

EXAMPLES 1-5 AND COMPARATIVE EXAMPLES C-6

Examples 1-5 illustrate the affect when a two step melt blending method is applied in melt blending reactive tougheners with PTT and ionomers.

Rear fed components listed in Table 2 for Examples 1-5 and C-6 were combined and fed to the rear of a ZSK 30 mm twin screw extruder and melt mixed using at a melt temperature of about 260° C. to yield a melt blended composition. The side fed components listed in Table 2 for Examples 1-5, including a Group B toughener, were combined and fed In the side of the extruder (barrel No. 6) to provide a second melt blend. Exiting the extruder, the second melt blends were passed through a die to form strands that were cooled and solidified in a quench tank and subsequently chopped to form pellets.

The compositions were molded into test specimens and tested according to the methods outlined above.

TABLE 2

| | Example No. | | | | | |
|---|---|---|---|---|---|---|
| | C-6 | 1 | 2 | 3 | 4 | 5 |
| Rear fed | | | | | | |
| PTT-E (0.976 IV) | 98.3 | 66.8 | 66.8 | 65.8 | 66.8 | 65.8 |
| Irganox ® 1010 | 0.20 | 0.20 | 0.20 | 0.20 | 0.20 | 0.20 |
| Ionomer-B | 1.00 | 1.00 | 1.00 | 1.00 | 1.00 | 1.00 |
| Loxiol PTS HOB7119 | 0.50 | 0.50 | 0.50 | 0.50 | 0.50 | 0.50 |
| Side fed | | | | | | |
| PTT-E (0.976 IV) | | 30.00 | 30.00 | 30.00 | 30.00 | 30.00 |
| NT-4 | | | | | 0.50 | 1.00 |
| Toughener B-1 | | 1.00 | 1.50 | 2.50 | 1.00 | 1.50 |
| Toughener B-2 | | 0.50 | | | | |
| Properties | | | | | | |
| Tensile Strength (Mpa) | 70 | 66 | 65 | 64 | 65 | 63 |
| Elongation at Break (%) | 7.7 | 20.8 | 15.8 | 16.5 | 15.1 | 15.4 |
| Tensile Strength (Mpa) 30 h PCT | 45.1 | 60.5 | 58.3 | 57.2 | 56.1 | 61.6 |
| Elongation at Break (%) 30 h PCT | 2.4 | 4.1 | 3.6 | 3.8 | 3.6 | 4.2 |
| 30 h PCT TS retention (%) | 64 | 91 | 90 | 90 | 86 | 98 |
| 30 h PCT El retention (%) | 31 | 19 | 23 | 23 | 24 | 27 |
| Notched Izod (KJ/m$^2$) | 3.7 | 4.5 | 4.6 | 4.8 | 4.7 | 5.0 |

TABLE 2-continued

| | Example No. | | | | | |
|---|---|---|---|---|---|---|
| | C-6 | 1 | 2 | 3 | 4 | 5 |
| Recrystallization peak (J/g) | 2.1 | 2.5 | 2.8 | 2.6 | 2.7 | 2.8 |
| Sum of alkali carboxylate level | 0.0885 | 0.0885 | 0.0885 | 0.0885 | 0.0885 | 0.0885 |
| Weight Averaged Neutalization Ratio X 100 | 59.0 | 51.2 | 59.0 | 59.0 | 59.0 | 59.0 |
| ACF, first melt blend | 5.22 | 7.62 | 7.62 | 7.74 | 7.62 | 7.74 |

ACF = alkali carboxylate factor calculated from formula 1.

Examples 1-5 indicate that when a two step melt blending method is applied, the addition of the Group B tougheners gave improvements in Notched Izod impact, and higher % retention of TS under the 30 hour pressure cooker test than the C-6 control. However, surprisingly and unexpectedly, the recrystallization peak endotherms for Examples 1-5, ranging from 2.5 to 2.8 J/g, were comparable to the C-6 control having no Group B toughener; and the recrystallization peak endotherms were much lower than similar compositions in Table 1 wherein the polymeric tougheners were rear fed.

EXAMPLE 6 AND COMPARATIVE EXAMPLES C-7

Examples 6 and 7 and comparative Example C-7 illustrate the affect a two step melt blending method is applied in melt blending Group B tougheners with PTT and ionomers, wherein the first melt blend has an ACF value between 4 and about 14; and the first melt blend is cooled and pelletized to form a masterbatch (MB) in the form of masterbatch 1 (MB-1).

COMPARATIVE EXAMPLE C-7

In Comparative Example C-7 all components listed in Table 3 were fed into the rear of a ZSK 30 mm twin screw extruder and melt blended at a melt temperature of about 260° C. to yield a melt blended composition. The composition exhibited an undesirably high recrystallization peak exotherm of 26.2 J/g.

EXAMPLE 6

Components of MB-1 listed in Table 3 were fed into the rear of a ZSK 30 mm twin screw extruder and melt blended at a melt temperature of about 260° C. to yield a melt blended composition. The melt blend was extruded into strands and pelletized to provide MB-1 having an ACF value of 5.74.

MB-1 pellets and the polymer tougheners listed in Table 3 were fed into the rear of a ZSK 30 mm twin screw extruder and melt blended at a melt temperature of about 260° C. to provide a second melt blend composition that was extruded into strands and pelletized. The second melt blend composition had the same components as comparative Example C-7. However, Example 6 exhibited a recrystallization exotherm of 1.8 J/g versus 26.2 J/g for C-7. This demonstrates that a two step melt blending process can provide a product having significantly different properties than a one step melt blending process using the same components.

EXAMPLE 7

Example 7 illustrates the use of a second masterbatch (MB-2) having a ACF value (52.2) significantly higher than the preferred ACF range of 4 to about 14.

Components of MB-2 listed in Table 3 were fed into the rear of a ZSK 40 mm twin screw extruder and melt blended at a melt temperature of about 260° C. to yield a melt blended composition. The melt blend was extruded into strands and pelletized to provide MB-2 having about 10 wt % Ionomer-B. MB-2 had an ACF value of 52.2.

MB-2 pellets, PTT, and the polymer tougheners listed in Table 3 were fed into the rear of a ZSK 40 mm twin screw extruder and melt blended at a melt temperature of about 260° C. to provide a second melt blend composition that was extruded into strands and pelletized. The second melt blend composition had about the same composition as Example 6, with the exception that less thermal stabilizer and lubricant were present. Although the final ACF values of Example 6 (5.59) and 7 (5.22) were similar, Example 7 exhibited a significantly higher recrystallization exotherm of 6.9 J/g, versus 1.8 J/g for Example 6. This demonstrates that, in the two step melt blending method, the first melt blend has a preferred range of ACF value, considered to be about 4 to 14.

TABLE 3

| | Example No. | | | | |
|---|---|---|---|---|---|
| | C-7 | MB-1 | MB-2 | 6 | 7 |
| Rear fed | | | | | |
| PTT-F (1.04 IV) | 95.8 | 98.2 | 89.3 | | 87.5 |
| Irganox ® 1010 | 0.2 | 0.20 | 0.20 | | |
| Ionomer-B | 1.00 | 1.10 | 10.00 | | |
| MB-1 | | | | 97.50 | |
| MB-2 | | | | | 10.00 |
| Loxiol PTS HOB7119 | 0.50 | 0.50 | 0.50 | | |
| NT-4 | 1.00 | | | 1.00 | 1.00 |
| Toughener B-1 | 1.50 | | | 1.50 | 1.50 |
| Properties | | | | | |
| Tensile Strength (Mpa) | 59.9 | NM | NM | 63.3 | 63.7 |
| Elongation at Break (%) | 14.95 | NM | NM | 14.68 | 15.84 |
| Tensile Strength (Mpa) 30 h PCT | 57.4 | NM | NM | 61.3 | 63.0 |
| Elongation at Break (%) 30 h PCT | 5.2 | NM | NM | 5.46 | 6.99 |
| 30 h PCT TS retention (%) | 96 | | | 97 | 99 |
| 30 h PCT El retention (%) | 35 | | | 37 | 44 |
| Notched Izod (KJ/m²) | | | | | |
| Recrystallization peak (J/g) | 26.2 | | | 1.80 | 6.90 |
| Sum of alkali carboxylate level | 0.0885 | 0.0974 | 0.885 | 0.0949 | 0.0885 |
| Weight Averaged NeutalizationRatio x 100 | 59.0 | 59.0 | 59.0 | 59.0 | 59.0 |
| ACF, first melt blend | 5.22 | 5.74 | 52.21 | 5.59 | 5.22 |

ACF = alkali carboxylate factor calculated from formula 1.
NM = not measured.

What is claimed is:

1. A method comprising:
   (A) melt blending first components comprising
      (a-1) a poly(trimethylene terephthalate) homopolymer or copolymer resin,
      (a-2) 0.1 to 4 weight % of one or more ionomer polymers or a combination of one or more ionomer polymers and acid copolymers; and
      (a-3) optionally, 0.1 to 20 weight percent one or more organic additives selected from the group consisting of thermoplastic polymers other than said (a-1), lubricants, flow modifiers, plasticizers, heat stabilizers, antioxidants, dyes, pigments, and UV stabilizers;
      to provide a first melt blend, wherein the weight percent of (a-2) and (a-3) is based on the total weight of (a-1), (a-2) and (a-3); and
   (B) melt blending said first melt blend with second components comprising:
      (b-1) about 0.5 to about 5 weight percent of one or more Group B polymeric toughener(s) selected from the group consisting of an ethylene copolymers of the formula E/X/Y wherein:
      E is the radical formed from ethylene;
      X is selected from the group consisting of radicals formed from $CH_2=CH(R^1)-C(O)-OR^2$ wherein $R^1$ is H, $CH_3$ or $C_2H_5$, and $R^2$ is an alkyl group having 1-8 carbon atoms; vinyl acetate; and mixtures thereof;
      wherein X comprises 0 to 50 weight % of E/X/Y copolymer;
      Y is one or more radicals formed from monomers selected from the group consisting of carbon monoxide, sulfur dioxide, acrylonitrile, maleic anhydride, maleic acid diesters, (meth)acrylic acid, maleic acid, maleic acid monoesters, itaconic acid, fumaric acid, fumaric acid monoesters and salts of said preceding acids, glycidyl acrylate, glycidyl methacrylate, and glycidyl vinyl ether: wherein Y is from 0.5 to 35 weight % of the E/X/Y copolymer, and E is the remainder weight percent and comprises 40-90 weight percent of the E/X/Y copolymer;
      with the proviso that Y must include at least one radical formed from monomers selected from the group consisting of maleic anhydride, (meth)acrylic acid, maleic acid, maleic acid monoesters, itaconic acid, fumaric acid, fumaric acid monoesters, salts of said preceding acids, and glycidyl acrylate, glycidyl methacrylate, and glycidyl vinyl ether;
      (b-2) optionally, one or more resins selected from the group poly(trimethylene terephthalate) homopolymer or copolymer resin, ionomer polymers and acid copolymers;
      (b-3) optionally, one or more organic additives selected from the group consisting of thermoplastic polymers other than said (a-1), lubricants, flow modifiers, plasticizers, heat stabilizers, antioxidants, dyes, pigments, and UV stabilizers;
      to provide a second melt blend, wherein the weight percent of (b-1) is based on the total weight of (a-1), (a-2), (a-3), (b-1), (b-2), and (b-3).

2. The method of claim 1, wherein in said first melt blend, said one or more ionomer polymers or a combination of one or more ionomer polymers and acid copolymers have C3 to C8 carboxylic acid repeat units, and each ionomer and acid copolymer have:
   a weight %, W, based on the weight of components (a-1), (a-2) and (a-3);
   a weight fraction of C3 to C8 carboxylic acid repeat units, Z, based on the weight of each ionomer or acid copolymer; and
   a neutralization ratio, N, equal to any value from 0 to 1.0;
   wherein said neutralization ratio N is the mol fraction of said carboxylic acid repeat units neutralized as an alkali metal salt, based on the total carboxylic acid repeat units in said ionomer and acid copolymers; and said first melt blend has an alkali carboxylate factor, ACF, of 4 to about 14; wherein said ACF is defined by the formula:

$ACF = \Sigma a\text{-}i[(W \cdot Z \cdot N)a\text{-}i(W \cdot N)a\text{-}i \cdot 100 / \Sigma a\text{-}i(W)a\text{-}i]$.

3. The method of claim 1, with the proviso that said melt blending first components does not comprise a Group B polymeric toughener.

4. The method of claim 1, wherein said second melt blend exhibits a recrystallization peak of less than 5 J/g as measured with Differential Scanning calorimetry at 10° C./min scan rate from a melt quenched sample.

5. The method of claim 1, wherein said poly(trimethylene terephthalate) homopolymer or copolymer comprises poly(trimethylene terephthalate) repeat units and end groups, said poly(trimethylene terephthalate) homopolymer or copolymer having a cyclic dimer content of less than or equal to 1.1 wt %, as determined with nuclear magnetic resonance analysis, based on the weight of said poly(trimethylene terephthalate) repeat units and said cyclic dimer; and said poly(trimethylene terephthalate) homopolymer or copolymer having an intrinsic viscosity of 0.80 to about 2.00 dL/g.

6. The method of claim 1, wherein the one or more ionomer polymers comprise an ethylene/methacrylic acid copolymer having about 5 to 25 wt % methacrylic acid repeat units based on the weight of the ethylene/methacrylic acid copolymer.

7. The method of claim 1, wherein said one or more Group B polymeric toughener(s) is selected from the group consisting of an ethylene copolymers of the formula E/X/Y wherein Y comprises glycidyl acrylate, glycidyl methacrylate, and glycidyl vinyl ether.

* * * * *